(12) United States Patent
Boissenin et al.

(10) Patent No.: US 7,896,293 B2
(45) Date of Patent: Mar. 1, 2011

(54) PROCEDURE AND DEVICE FOR IMPROVING THE MANEUVERABILITY OF AN AIRCRAFT DURING THE APPROACH TO LANDING AND FLARE-OUT PHASES

(75) Inventors: Stéphane Boissenin, Toulouse (FR); Jacques Rosay, Toulouse (FR)

(73) Assignee: Airbus, Toulouse (FR)

( * ) Notice: Subject to any disclaimer, the term of this patent is extended or adjusted under 35 U.S.C. 154(b) by 76 days.

(21) Appl. No.: 12/136,887

(22) Filed: Jun. 11, 2008

(65) Prior Publication Data

US 2009/0314897 A1    Dec. 24, 2009

Related U.S. Application Data

(62) Division of application No. 11/182,864, filed on Jul. 18, 2005, now Pat. No. 7,614,587.

(60) Provisional application No. 60/614,394, filed on Sep. 30, 2004.

(30) Foreign Application Priority Data

Jul. 16, 2004    (FR) ................................. 04 07952

(51) Int. Cl.
*B64C 9/32* (2006.01)
(52) U.S. Cl. .................... 244/183; 244/187; 244/110 D
(58) Field of Classification Search ................ 244/75.1, 244/76 R, 183, 187, 113, 110 D; 73/178 T
See application file for complete search history.

(56) References Cited

U.S. PATENT DOCUMENTS

| | | | | |
|---|---|---|---|---|
| 2,369,152 A | * | 2/1945 | Lowell et al. | 244/215 |
| 2,384,997 A | * | 9/1945 | Hansson | 244/113 |
| 2,421,870 A | * | 6/1947 | Dornier et al. | 244/113 |
| 2,462,459 A | * | 2/1949 | Bigelow | 244/113 |
| 2,612,329 A | * | 9/1952 | Crandall et al. | 244/217 |
| 2,791,385 A | * | 5/1957 | Johnson | 244/213 |
| 3,589,648 A | | 6/1971 | Gorham et al. | |
| 3,738,594 A | | 6/1973 | Donovan et al. | |
| 4,040,580 A | * | 8/1977 | Schwaerzler | 244/78.2 |
| 4,042,197 A | * | 8/1977 | Boyle et al. | 244/183 |
| 4,087,065 A | * | 5/1978 | Arnquist et al. | 244/221 |
| 4,093,159 A | * | 6/1978 | Gilson | 244/187 |
| 4,419,732 A | * | 12/1983 | Lambregts et al. | 701/16 |
| 4,956,780 A | * | 9/1990 | Sankrithi et al. | 701/16 |
| 5,112,009 A | * | 5/1992 | Farineau | 244/181 |
| 5,377,937 A | * | 1/1995 | LaMay et al. | 244/185 |
| 5,735,485 A | * | 4/1998 | Ciprian et al. | 244/113 |
| 6,450,456 B1 | * | 9/2002 | Greene | 244/186 |

(Continued)

*Primary Examiner*—Benjamin P Lee
(74) *Attorney, Agent, or Firm*—Oblon, Spivak, McClelland, Maier & Neustadt, L.L.P.

(57) ABSTRACT

The process improves the maneuverability of an aircraft during the approach to landing and then flare-out phases, the aircraft being equipped with air brakes. According to the process, the air brakes are put in a first deployed position during the approach phase, and as a function of a representative parameter of a given altitude and in case of a steep angle approach, they are actuated to transition to a second more retracted position than the first position so as to achieve a flare-out allowing to essentially maintain the same angle of incidence, corresponding in case of a steep angle approach to achieve a flare-out with habitual exterior piloting references during the flare-out phase.

17 Claims, 13 Drawing Sheets

U.S. PATENT DOCUMENTS 6,676,088 B1 * 1/2004 Greene ................... 244/187
7,212,135 B1 * 5/2007 Lynch et al. ............. 340/971
2003/0106961 A1   6/2003 Wyrembek et al.

* cited by examiner

PROCEDURE AND DEVICE FOR IMPROVING THE MANEUVERABILITY OF AN AIRCRAFT DURING THE APPROACH TO LANDING AND FLARE-OUT PHASES

CROSS REFERENCE TO RELATED APPLICATIONS

This application is a divisional of and claims the benefit of priority under 35 USC §120 from U.S. application Ser. No. 11/182,864, filed Jul. 18, 2005, the entire contents of which are incorporated herein by reference. This application also claims benefit of priority under 35 USC §119 (e) from U.S. Provisional Application Ser. No. 60/614,394, filed Sep. 30, 2004, and is based upon and claims the benefit of priority under 35 USC §119 from the French Patent Application No. 0407952, filed Jul. 16, 2004.

BACKGROUND OF THE INVENTION

This invention concerns the improvement of the maneuverability of an aircraft during the approach to landing and then flare-out phases with the aid of an appropriate control of the spoiler flaps, also called air brakes.

By "improving the maneuverability of an aircraft" one understands here that which facilitates its operation.

DISCUSSION OF THE BACKGROUND

The main portion of approaches to landing, with respect to commercial aircraft is carried out under a classic flight path angle $\gamma$ of $-3°$ approximately.

In reference to FIG. 5, please note that the flight path angle $\gamma$ corresponds to the angle between the velocity vector V of the center of gravity C of the aircraft and the horizon H.

The trim $\theta$ is the angle between the axis A of the aeroplane A and the horizon H, and the angle of incidence $\alpha$ the angle between the axis A of the aircraft and the velocity vector V. The relationship connecting these various angles is the following: $\theta = \alpha + \gamma$.

Generally speaking, the aerodynamic configuration of an aircraft is modifiable in particular with the aid of air brakes, flaps and leading edge slats.

In an approach-to-landing phase at the so-called classic angle in the order of $\gamma=-3°$, the aerodynamic configuration of an aircraft results from the air brakes being retracted, the flaps being deployed and the leading edge slats being deployed. Such an aerodynamic configuration, in association with a given approach velocity, forces the aircraft to fly at a certain angle of incidence and hence at a certain pitch. Since most approaches in view of a landing are carried out with a classic flight path angle of $-3°$, pilots are in the habit of performing every time the same landing with angles of incidence and of pitch that are essentially similar at each landing. Since during the landing phase the pilot cannot divert his attention by checking the flight path angle and incidence gauges, he evaluates, to some extent, the behavior of the aircraft according to the pitch, by observing the attitude of the aircraft with respect to the outside environment.

The development of certain airports located in urban areas as well as efforts related to aircraft noise reduction have led to the appearance of new specific approach procedures. Such specific approach procedures continue to impose flight path angles that are superior (as absolute value) to the classic flight path angle of $-3°$. Typically these specific approach angles, also known as steep angle approaches, have values below $-4.5°$.

In order to maintain the required flight path angle, while keeping the velocity of the aircraft constant during the approach to landing, a specific drag/thrust balance must be obtained. A large majority of airplanes operating in this kind of approach are equipped with pusher type airscrews. This type of motorization allows, due to the orientation of the airscrews, to obtain the necessary lift to drag ratio to follow the required flight path angle.

For airplanes equipped with turbojet engines, it is necessary to make use of aerodynamic tricks in order to achieve the necessary lift to drag ratio.

On certain aircraft spoilers (or air brakes) are used. The air brakes constitute aerodynamic control surfaces, generally installed on the top side of the wings, behind their structural chassis and ahead of the trailing edge flaps on which rest their own trailing edges.

Under the action of actuators, for instance hydraulic, electrical or mechanical jacks which are themselves controlled for instance by a lever operated by the pilot of the aircraft, said air brakes may assume:

either a retracted position for which they are lodged in the top side of the corresponding wing, ensuring the aerodynamic continuity of said top side of the wing;

or one or the other of the deployed positions for which they jut out from the top side of the corresponding wing, being inclined in relation to said top side of the wing.

Thus, in the retracted position said air brakes are integrated into the aerodynamic profile of the top sides of the wings of the aircraft. Whereas for each of the deployed positions, each of which is associated with a specific function and is defined by a value of the control surface angle in relation to the corresponding wing top side, said air brakes produce diminished lift and increased drag the amplitudes of which depend on said control surface angle and of the surface of said air brakes.

These air brakes may be used for different purposes such as:

reduction of the velocity of the aircraft at the end of the landing phases and possibly the abortion of the take-off.

reduction of the velocity of the aircraft in flight or increase of the flight path angle of said aircraft;

adhesion of the aircraft to the ground to improve braking during the landing or take-off aborting phases;

on approach at the classic flight path angle ($-3°$), automatic coupling (continuous oscillation) of the deflection of the aircraft with reference input (pitch of the aircraft in relation to the trajectory of descent, altitude, vertical speed) depending on the deviation of the reference input from the actual position of the aircraft (U.S. Pat. No. 3,589,648);

in-flight control of the wing-over [or rolling] of the aircraft by acting asymmetrically on the air brakes of the two wings;

generation of a yawing moment by asymmetric action on the air brakes of the two wings participating in countering the effects of an engine failure during take-off; or aid in diminishing the fixed end wing/fuselage moment at the heavy load factors (maneuvers, wind gusts), by modifying the distribution of lift along the wings.

So, the functions performed by the air brakes are varied.

By diminishing the ratio of lift to drag, deflecting the air brakes allows also to increase the angle of descent at a given speed. This is already being used in the event of a sudden decompression of the aircraft, obliging the pilot to descend to an altitude where the passengers are able to breathe the ambient air without [oxygen] masks.

The inventors have considered using this property in the event of an approach at a steep flight path angle. Thus, thanks to the deployment of the air brakes, the steep flight path angles imposed by airports in urban areas can be complied with by the airplanes.

The inventors have however observed that at the time of flare-out (when the pilot pulls back on the control stick (or wheel) to redress the aircraft before touchdown on the runway), the aircraft is in this configuration less maneuverable. In effect, the aircraft responds too more slowly to the pilot's request than in the case where the air brakes are retracted. This is due to the fact that in order to redress the aircraft and to break the flight path angle, it is necessary to generate a greater load factor and that the time attributed to this action is shorter than in a classic approach. In order to generate this load factor it is necessary to increase the incidence and hence the trim by a greater value than in a classic approach. To reduce the flight path angle down to a value which ensures a sufficiently soft impact, it is also necessary to proceed to a trim change of a greater value than in a classic approach, because the original flight path angle is greater. Thus, the trim engagements during the flare-out are almost two times greater during a steep angle approach than during a classic approach. The steeper the angle, the greater must be the trim variation. Thus the outside references of the pilot are completely modified and piloting in this flight phase, under these particular conditions, becomes less natural and makes demands on the pilot for an adaptation phase and heightened attention.

SUMMARY OF THE INVENTION

The present invention eliminates these drawbacks.

It concerns a process for the improvement of maneuverability of an aircraft during the approach to landing and then flattening-out phases, the aircraft being equipped with air brakes.

According to a general definition of the invention the air brakes are placed in a first deployed position during the approach phase and, as a function of a representative parameter of a given altitude, and in case of a steep flight path angle, they are ordered to transition to a second, more retracted position than the first position.

According to another aspect of the invention, the process for improving the maneuverability of an aircraft during the approach to landing and then flattening-out phases, the aircraft being equipped with air brakes, is characterized by the fact that it comprises the following steps:
provide means for operating the air brakes and control devices suitables for actuating said means for operating the air brakes,
place the air brakes in a first deployed position during the approach phase and,
as a function of a representative parameter of a given altitude, and in case of an approach at a steep flight path angle, activate automatically the transition of the air brakes to a second, more retracted position than the first position.

In other words, the retraction of the air brakes from the first position to the second position according to the invention allows achieving a flare-out which allows to maintain to a large extent the same angle of incidence, corresponding, in case of an approach at a steep flight path angle, to a flare-out with the usual exterior piloting references during the flare-out phase.

In practice, the retraction of the air brakes from the first position to the second position is irreversible until the landing gear is under load.

According to another version, the retraction of the air brakes from the first position to the second position is progressive.

According to yet another version, the retraction of the air brakes is made from a completely deployed first position all the way to a completely retracted second position.

As a variant, the retraction of the air brakes is made from a first, at least partially deployed position to a second, at least partially retracted position.

According to another characteristic where the aircraft is equipped with trailing edge flaps, the process also includes a step in which the trailing edge flaps are put into a first deployed position during the approach to landing phase and, as a function of a representative parameter of a given altitude, and in case of an approach at a steep flight path angle, they are actuated to transition to a second more deployed position than the first position.

In practice, the deployment of the trailing edge flaps from the first position to the second position is irreversible until the landing gear is under load.

According to one realization, the activation of the trailing edge flaps is automatic.

In practice, the deployment of the trailing edge flaps from the first position to the second position is progressive.

For example, the control of the air brakes and the control of the trailing edge flaps are interconnected.

The present invention also concerns a device for improving the maneuverability of an aircraft during the approach to landing and then flare-out phases, with the aircraft being equipped with air brakes.

According to this other aspect of the invention, the device includes actuation means for placing the air brakes in a first deployed position during the approach phase and suitable control devices, as a function of a representative parameter of a given altitude, and in case of an approach at a steep flight path angle, to command the actuation means for transitioning the air brakes to a second more retracted position than the first position.

According to a realization version of the manual type, the control devices are of the manual control lever type while the actuation means include a computer capable of controlling the retraction of the air brakes in response to a command emitted by the control lever.

According to another aspect of the invention the device includes actuation means for the air brakes as well as control devices suitable for controlling said actuation means for the air brakes, the control devices being suitable for putting the air brakes in a first deployed position during the approach phase, and that, as a function of a representative parameter of a given altitude, and in case of an approach at a steep flight path angle, the control devices are suitable for automatically commanding their transition to a second, more retracted position than the first position.

In practice the control devices are of the computer type suitable for emitting a command sequence upon an altitude threshold while the actuation means are of the computer type suitable for controlling the retraction of the air brakes in response to said order emitted by the control devices.

As a variant the control devices are of the computer type suitable for emitting an order sequence as a function of the altitude while the actuating means are of the computer type suitable for controlling the retraction of the air brakes in response to said order emitted by the control devices.

The present invention also concerns an aircraft equipped with air brakes including a device for improving the maneuverability of an aircraft during the phases of landing approach and then of flare-out of the type described above.

BRIEF DESCRIPTION OF THE DRAWINGS

Other characteristics and advantages of the invention will become clear in light of the detailed description below and the drawings in which.

Figure 1:
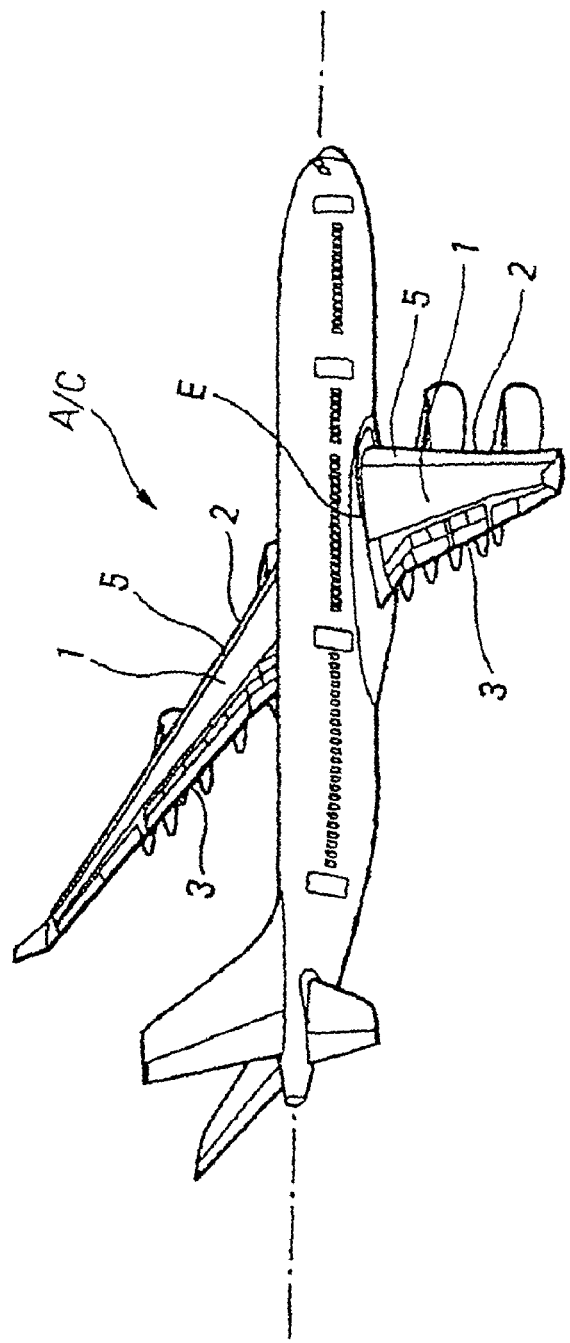
FIG. 1 shows, in flight and from above, a civilian jumbo-jet.

The A/C jumbo jet shown in FIG. 1 has two wings 1.

Figure 2:
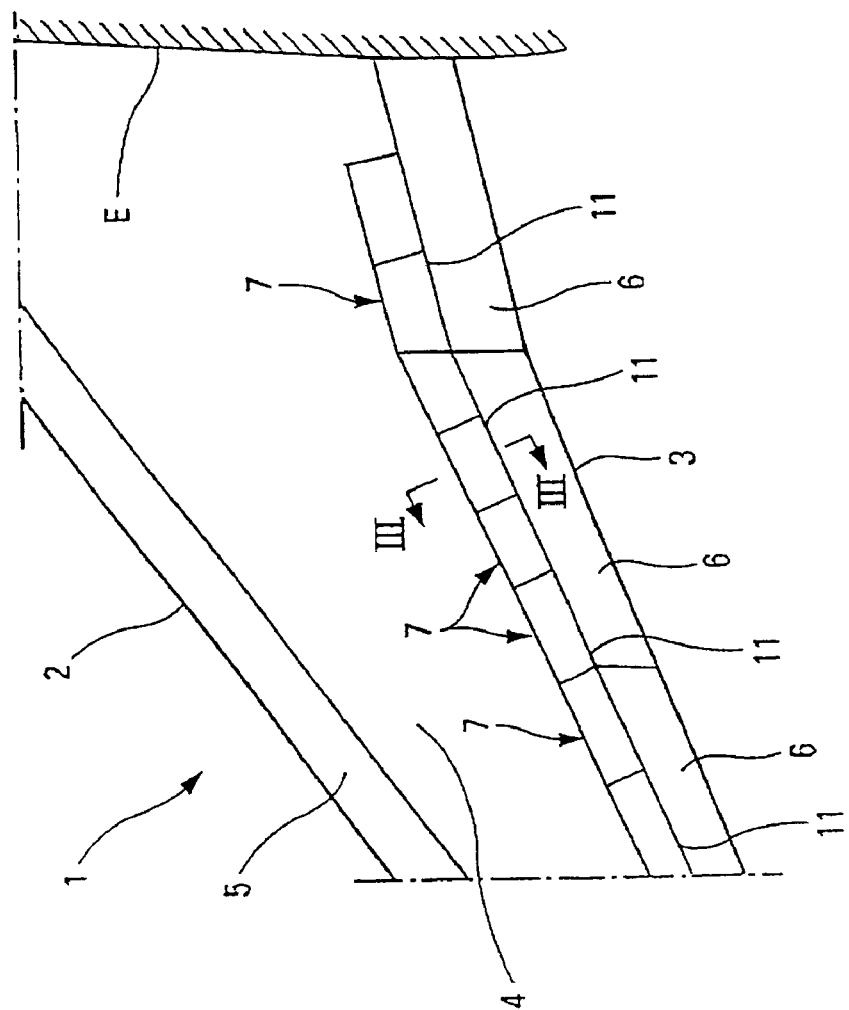
FIG. 2 shows, in a top schematic partial view, and at a larger scale, one wing of the airplane shown in FIG. 1 with its deflector flaps, its leading edge slats and its trailing edge flaps in retracted position.

As shown at a larger scale in FIG. 2, each wing 1 includes a leading edge 2, a trailing edge 3, a wing top 4 and a wing root E.

The leading edge 2 is formed by at least one high lift leading edge slat 5.

The trailing edge 3 of wing 1 is formed by the juxtaposition of the trailing edges of a number of adjacent trailing edge flaps 6.

In the top side 4 of the wing, upstream of the trailing edge flaps 6 (with respect to the aerodynamic flow over the wing 1), is located a number of deflecting flaps 7, whose plane form is that of a rectangle or of a rectangular trapezoid.

DETAILED DESCRIPTION OF THE PREFERRED EMBODIMENTS

Figure 3:
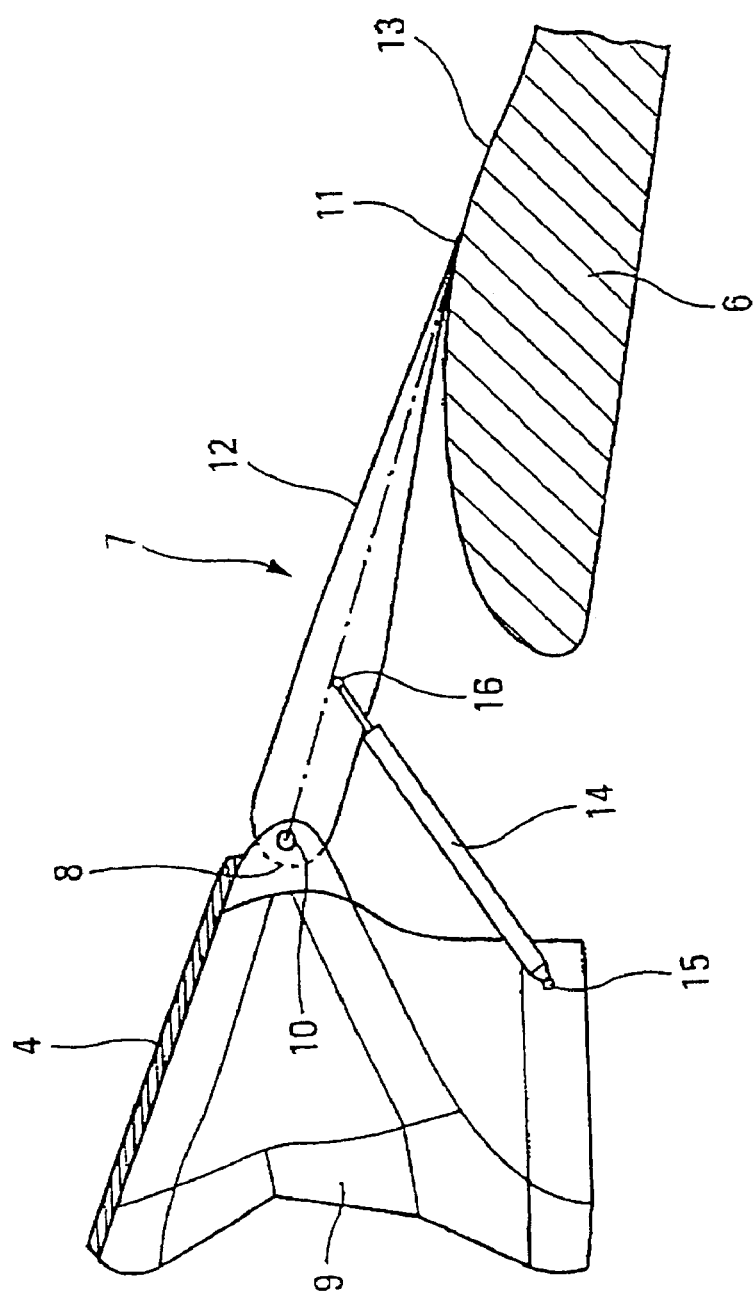
FIG. 3 is a schematic section view, partial and enlarged, along the line III-III of FIG. 2.

As is shown in FIG. 3, each deflecting flap 7 is hinged, on the side of its leading edge 8, to the structure 9 of wing 1 around an axis 10, parallel to the leading edge 8.

In the retracted position represented in FIGS. 2 and 3, the trailing edge 11 of each deflecting flap 7 is supported by a trailing edge flap 6 and the top side 12 of the deflecting flap 7 provides the aerodynamic continuity between wing top 4 of wing 1 and the top side 13 of flap 6.

Furthermore, each deflecting flap 7 is connected to the structure 9 of wing 1 by a slanting leg constituted by a jack 14, the ends 15 and 16 of which are hinged on said structure 9 and said deflecting flap 7 respectively.

In retracted position of deflecting flap 7, as described in FIGS. 2 and 3, the jack 14 exerts a force in order to maintain the flap in retracted position.

Figure 4:
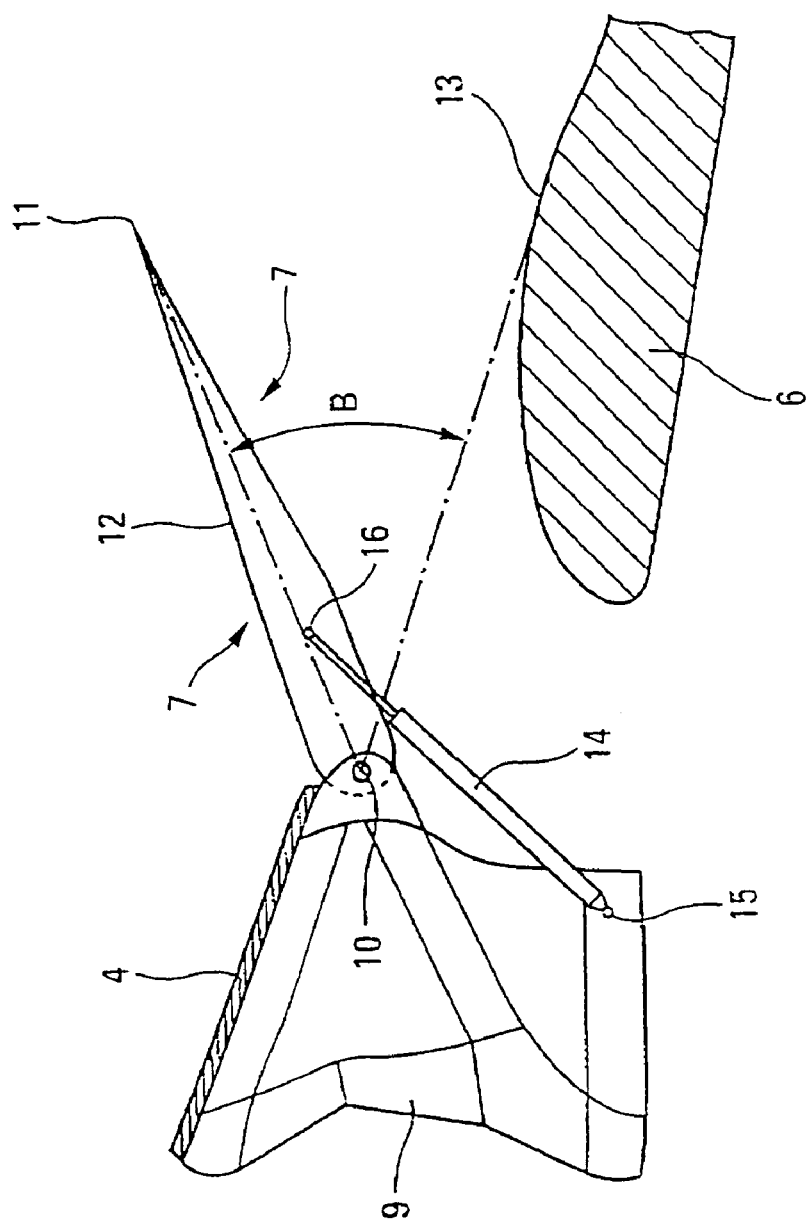
FIG. 4 shows, in a view similar to FIG. 3, a deflector flap in a deployed position.
Figure 5:
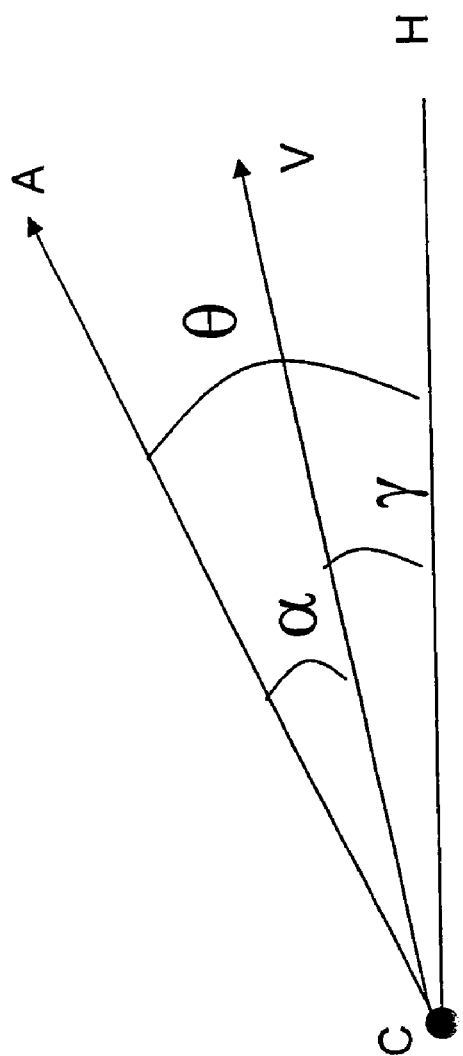
FIG. 5, already described previously, is a schematic representation of the relationship between the trim, the angle of incidence and the incline of an aircraft.

When jack 14 is activated for extension, the deflecting flap 7 pivots progressively around axis 10 while deploying. As shown in FIG. 4, for a deployed position corresponding to a control surface angle B, the deflecting flap 7 allows reducing the lift and to increase the drag of wing 1 in proportion to the value of said control surface angle B.

Of course, although in FIG. 4 only a single deployed position is shown representing one value of the control surface angle B, it goes without saying that the deflecting flap 7 can assume one or several other deployed positions corresponding to other values of this angle.

According to invention, the air brakes are controlled appropriately during the steep angle approach and flare-out phases in a manner to improve the maneuverability of the aircraft.

In practice, the air brakes are put into a first deployed position during the landing approach phase, and at a given altitude and in case of a steep angle approach, their transition to as second more retracted position than the first position.

The retraction of the air brakes from the first position to the second position is irreversible until the landing gear is under load. Such a deflection at a steep angle is not accompanied by a modification of the configuration of the aircraft (thrust, as for instance in the document U.S. Pat. No. 3,589,648) in order to compensate for the action of the air brakes.

The deflection of the air brakes is diminished, for instance progressively, up to a level acceptable for the beginning of the flare-out, the air brakes continuing to retract during the course of the maneuver until they reach the completely retracted position (so-called 0 position).

For example, the air brakes are set at 30° during the approach phase, then begin to retract at 40 m off the ground. At the beginning of the flare-out (for example at 20 m off the ground) the air brakes are set for instance at 15° and they continue to return progressively down to 0° for instance, the value reached at 10 m.

In practice, retraction of the air brakes from the first position to the second position is irreversible until the landing gear is under load.

Retraction of the air brakes is for instance automatic so as not to increase the work load of the crew in this critical phase of the flight.

In practice the control for retraction of the air brakes is based on an altitude information.

The altitude at which the return command is given by the system is for instance calculated as a function of the retraction of the surfaces, of their initial position, of the desired position at the time of flare-out and of the vertical descent speed, so that:

$$Hra\ (ft) = Har\ (ft) + RS\ (°/s) * Vz\ (ft/s) \frac{BA(°) - BF(°)}{}$$

Equation in which:

BA: deflection of air brakes during approach

Vz: vertical speed during the approach

Hra: altitude (for) return of air brakes

Har: Altitude (for) flare-out

Retraction of the air brakes is compensated conventionally by an action of the control law on the pitching (nosing?) control.

Advantageously, the device according to invention restitutes to the pilot the environmental conditions and external landmarks he is used to perceive during classic approaches (flight path angle in the order of 3° or analog) while being able to use the air brakes in the descent phase, in order to increase the incline of the airplane.

Furthermore, by returning the aircraft to a 'habitual' aerodynamic configuration, one restitutes also a known and satisfactory maneuverability.

In other words, the retraction of the air brakes has the function of realizing a flare-out that allows essentially to conserve the same angle of incidence. So for a flare-out following a steep angle approach, the retraction of the air brakes serves to realize a maneuver (the flare-out) with references (in particular visual exterior references) that are essentially identical to those the crews perceive during flare-outs after classic approaches (3° flight path angles). In effect the lift needed for the breakup of the trajectory is generated without significantly increasing the angle of incidence, only by modifying the aerodynamic configuration of the aircraft and in particular by retracting the air brakes.

This generation of "direct" lift by retracting the air brakes is faster and offers the advantage of maneuverability in this critical flight phase.

The breakup of the trajectory can hence be directly perceived by the pilot as a trim variation, with values entirely comparable to those of classic approaches, with a small flight path angle such as −3°.

The application of the device according to invention is for example made on an Airbus A318 which aims for landing approaches at steep angles, for example up to −5.5°.

Figure 6:
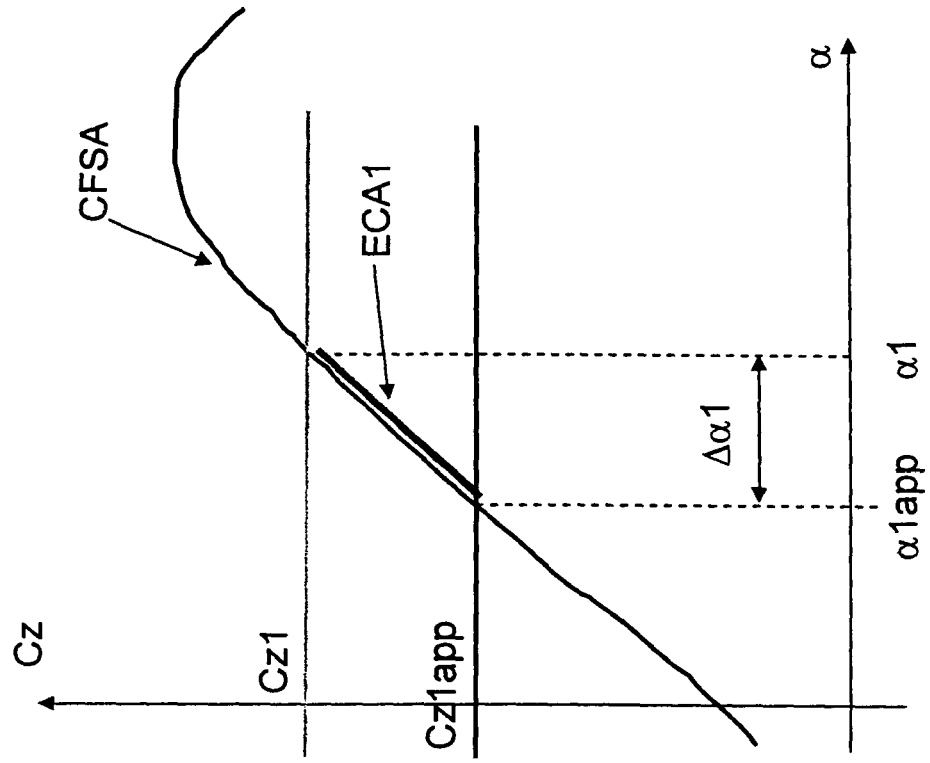
FIG. 6 is a diagram illustrating, for a configuration of the aircraft in FIG. 1 on landing approach, the variation of the lift coefficient of this plane as a function of its angle of incidence, the air brakes not being deployed during this landing approach. The figure also shows the variation of this lift coefficient during the flare-out phase (bold line) following an approach at the classic flight path angle (−3°)

In reference to FIG. 6, a diagram is described which illustrates, for a configuration of an aircraft on approach at a shallow flight path angle, the variation of the lift coefficient of this aircraft as a function of its angle of incidence.

The air brakes are here retracted. The CFSA curve corresponds to the so-called "without air brakes" dynamic configuration, i.e., with completely retracted air brakes.

Also shown on this diagram, in bold lines, is the ECA1 variation corresponding to the variation of the lift coefficient during the flare-out phase.

On approach at a shallow angle (γ1=−3°), the angle of incidence α1app corresponds to an approach lift coefficient Cz1app. For example the angle of incidence α1app is about 8°.

The angle of incidence α1 for the flare-out corresponds to a lift coefficient necessary for the flare-out Cz1, Cz1 being the lift coefficient necessary to generate the service load factor to adequately break up the inclination angle of −3°. For example α1 is 9.5°. The inclination angle at the end of the flare-out is for instance equal to −1°.

The variation of the angle of incidence Δα1 (α1−α1app) during the flare-out is for instance 1.5°.

The trim θ1 when the wheels touch down is for instance about 8.5°. The trim variation Δθ1 during the flare-out is for instance 3.5°.

Figure 7:
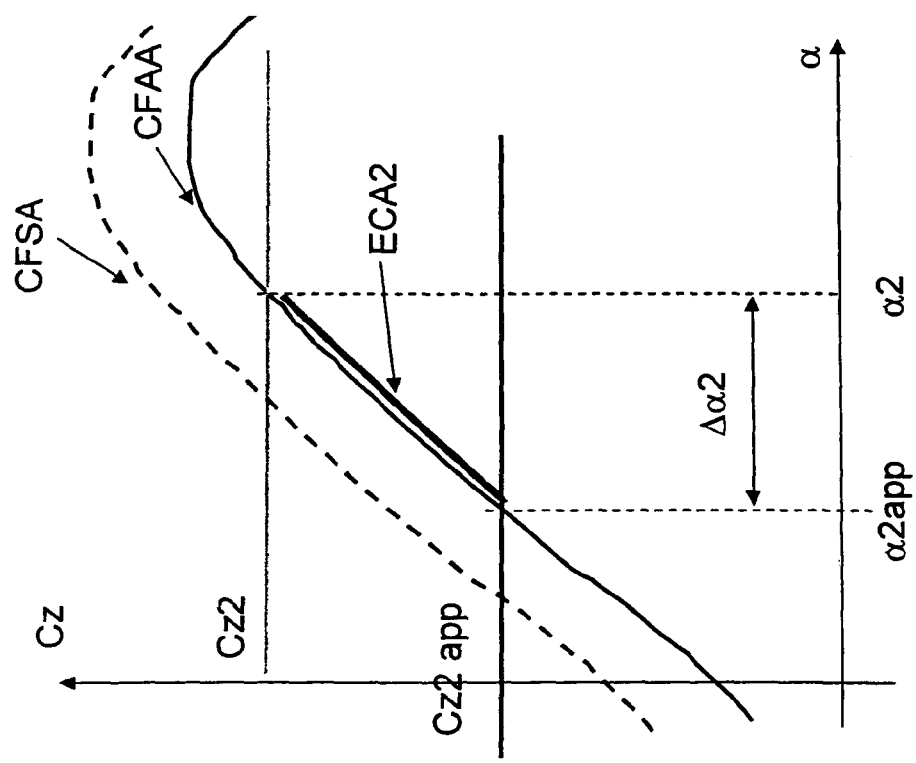
FIG. 7 is a diagram illustrating, for a configuration of said aircraft on landing approach, the variation of the lift coefficient of this plane as a function of its angle of incidence, the air brakes being deployed during this landing approach. The figure also shows the variation of this lift coefficient during the flare-out phase (bold line) following an approach at the steep angle (−5.5°)

With reference to FIG. 7, the aircraft is on a steep angle approach (for example γ2=5.5°).

The air brakes are here deployed during the approach and flare-out phases. The CI-AA curve in continued lines corresponds to the dynamic configuration known as "with air brakes deployed".

In a dotted line the CFSA curve without the air brakes is also shown.

Also shown on this diagram, in a bold line, is the ECA2 variation which corresponds to the variation of the lift coefficient during the flare-out phase.

The angle of incidence α2app corresponds to an approach lift coefficient Cz2app. For example the angle of incidence α2app is about 9°.

The angle of incidence α2 for the flare-out corresponds to a lift coefficient that is necessary for the flare-out Cz2, with Cz2 being the lift coefficient that is necessary to generate the service load factor to adequately break up the inclination angle of −5.5°. For example α2 is 12°.

The variation of the angle of incidence Δα2 (α2−α2app) during the flare-out is for instance 3°.

The trim θ2 when the wheels touch down is for instance about 11°. The trim variation Δθ2 during the flare-out is for instance 7.5°.

The trim variation Δθ2 is here fairly large and significantly different from the trim variation observed in the preceding case of a flare-out following an approach at the classic flight path angle of 3° which makes the maneuverability of the aircraft a delicate matter.

Figure 8:
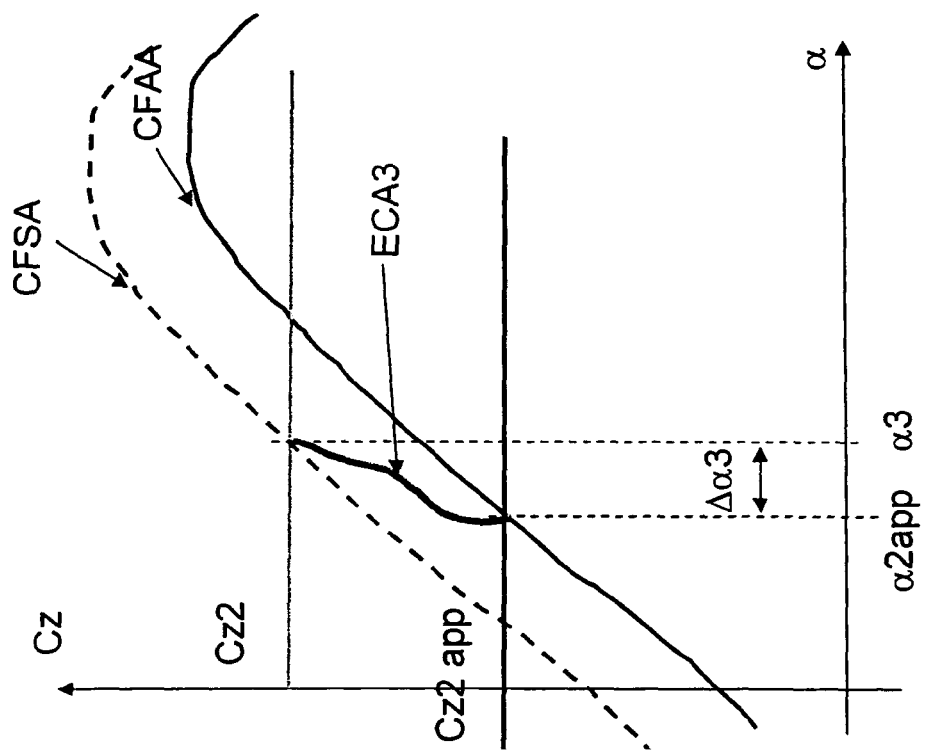
FIG. 8 is a diagram illustrating (in bold line), for a configuration of said aircraft on a steep angle (−5°) landing approach, the variation of this lift coefficient of said aircraft, as a function of its angle of incidence during the flare-out, the air brakes being progressively retracted from a deployed position to a more retracted position than the first, according to invention.

With reference to FIG. 8, the aircraft is on a steep angle (γ2=5.5°) approach to landing.

The air brakes move from the deployed position (CFAA curve) to the retracted position (CFSA curve) according to invention during the approach to landing and flare-out phases. This transition from one curve to the other corresponds to the deflection of the air brakes from a deployed position to a more retracted position. For example, this deflection is progressive at a speed in the order of 5° per second.

Also shown on this diagram is, in a bold line, the variation ECA3 which corresponds to the variation of the lift coefficient during the flare-out phase.

The angle of incidence α2app corresponds to an approach lift coefficient Cz2app. For example the angle of incidence α2app is about 9°.

The angle of incidence for the flare-out corresponds now the angle of incidence that is necessary to obtain a lift coefficient Cz2 on the CFSA curve, i.e., α3=9.5°.

The variation of the angle of incidence $\Delta\alpha3$ during the flare-out ($\alpha3-\alpha2app$) is thus 0.5° (i.e., it allows to maintain essentially the same angle of incidence).

Thus, with a trim $\theta2=\theta3$ on approach equal to 3.5°, one obtains according to invention a trim variation $\Delta\theta3$ during the flare-out of 5°.

The digital application shows that the trim variation during the flare-out ($\Delta\theta3=5°$) with the device according to invention during a steep angle approach ($\gamma=-5.5°$) is less than the trim variation during the flare-out ($\Delta\theta2=7.5°$) without the device according to invention during a steep angle approach. The trim variation is thus comparable to the one obtained ($\Delta\theta1=3.5°$) during a shallow angle approach.

Figure 9:
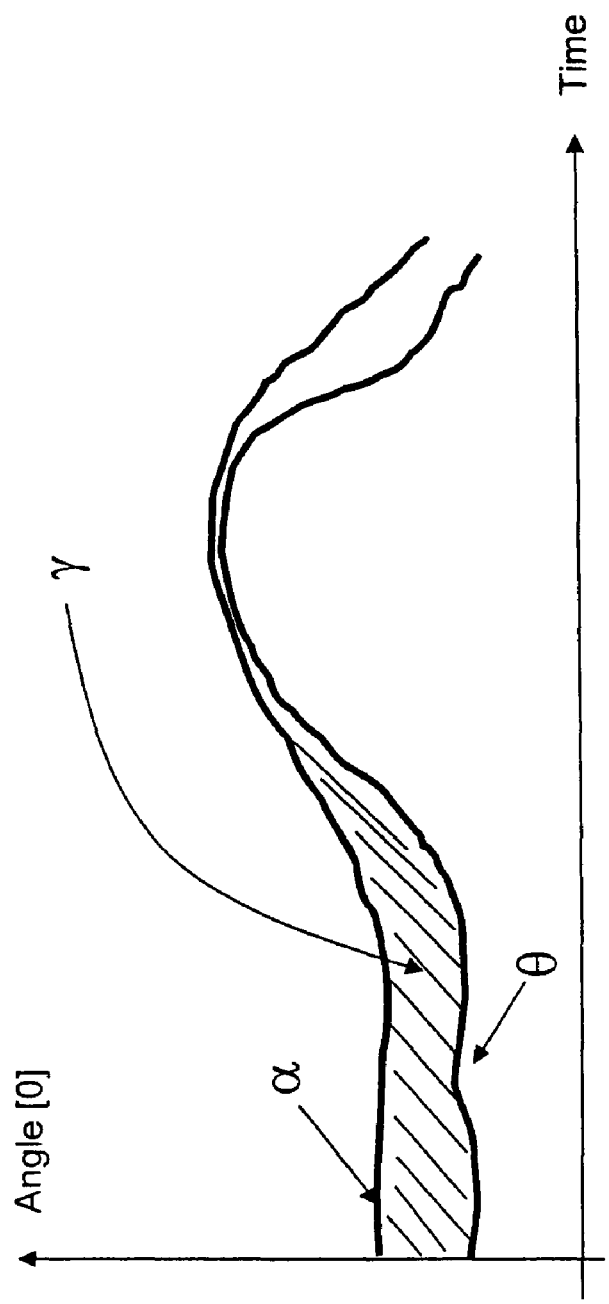
FIG. 9 is a diagram illustrating the variation of the flight path angle, of the angle of incidence and the trim, for an altitude evolving, as a function of time, between 40 m and the ground.

With reference to FIG. 9, one has described the variation of the flight path angle, of the angle of incidence and of the trim, for an altitude evolving, as a function of time, between 40 m and the ground. One can see that the variation of the flight path angle is directly linked to the variation of trim and of the angle of incidence.

Figure 10:
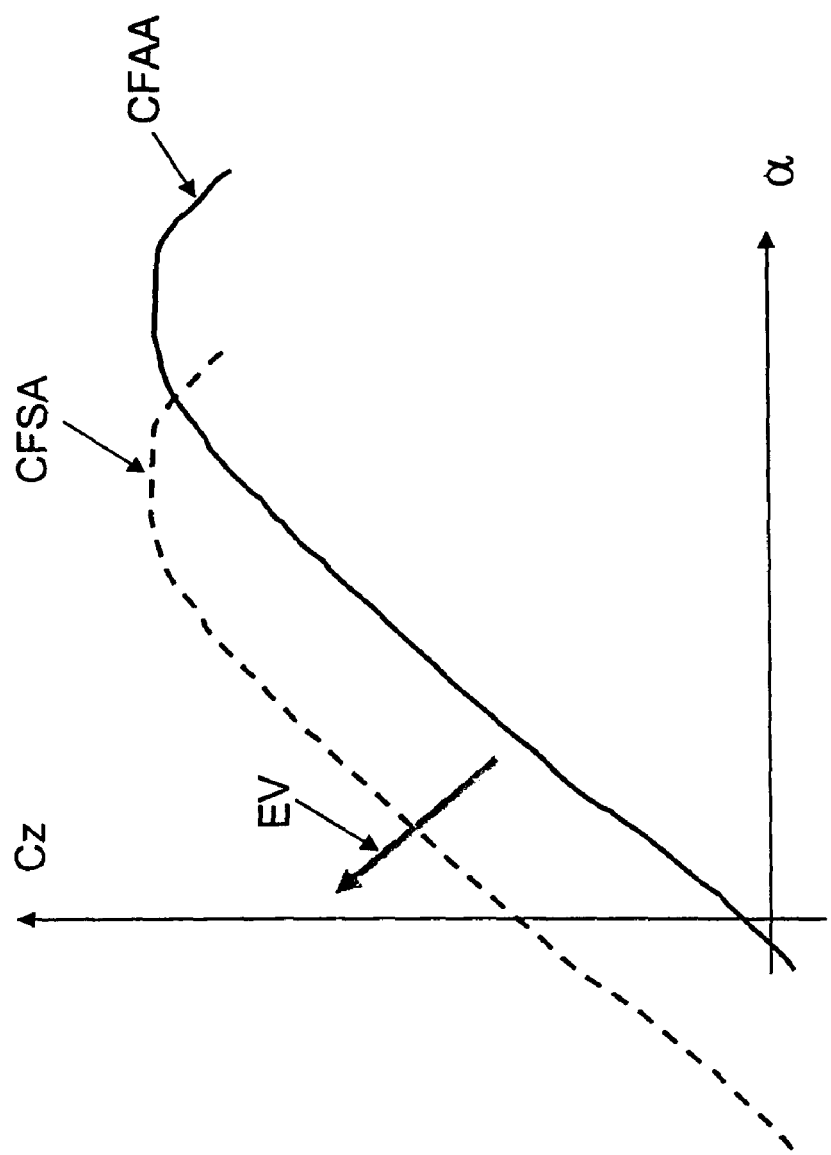
FIG. 10 is a diagram illustrating, for a configuration of said aircraft on a landing approach, the effect of a deployment of the trailing edge flaps on the variation of the aircraft's lift coefficient as a function of its angle of incidence, the trailing edge flaps going from a first deployed position to a second more deployed position than the first according to invention.

With reference to FIG. 10, shown are the CFSA and CFAA curves described in the references to FIGS. 6 to 8.

An improvement of the maneuverability of an aircraft during the steep angle approach and then flare-out phases can also be achieved with the help of a suitable control of the trailing edge flaps. This improvement is similar to the one achieved with the air brakes control described above.

Thus, the trailing edge flaps are put in a first deployed position during the approach phase and at a given altitude and in case of a steep angle approach, they are given a command to move to a second more deployed position than the first position.

The trailing edge flaps move from the deployed position (CFAA curve) to the superior deployed position (CFSA curve) according to invention during the approach and flare-out phases. This EV move from one curve to another corresponds to the deflection of the trailing edge flaps from a deployed position to a more deployed position. For example, this deflection is progressive at a speed in the order of 5° per second.

For example the control of the trailing edges flaps is automatic.

In practice, the deployment of the trailing edge flaps from the first position to the second position is progressive.

For example, the control of the air brakes and the control of the trailing edge flaps are conjugated (coupled).

Figure 11A:
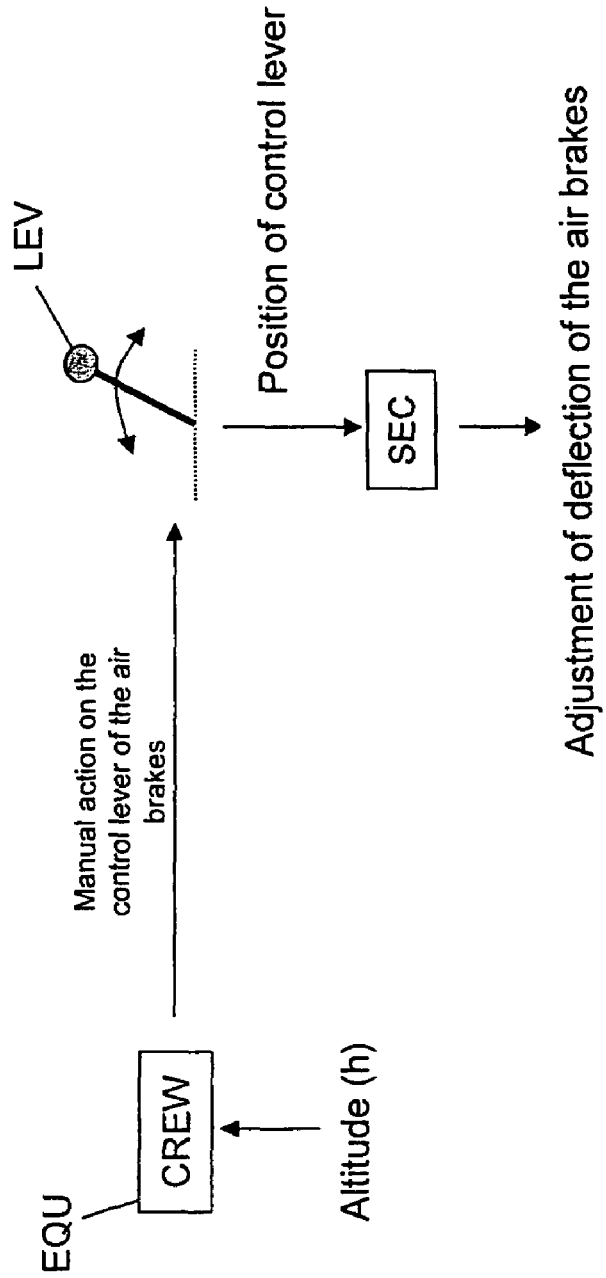
FIG. 11a shows schematically a manual control device according to invention, for improving the maneuverability of an aircraft of FIG. 1 during the landing approach and then flare-out phases.

With reference to FIG. 11*a*, a manually activated device for the retraction of the air brakes has been described.

The aircraft comprises a flight control computer CALC1.

At the sight of a chosen parameter, in practice the altitude of the aircraft, the crew EQU manually controls by action on the control lever LEV of the air brakes, the position POS (total retraction for example) of the air brakes. The position of the lever POS is registered by the flight control computer CALC1 which in response orders the deflection (retraction) of the air brakes. In practice, the retraction is progressive, for instance 5° per second.

Figure 11B:
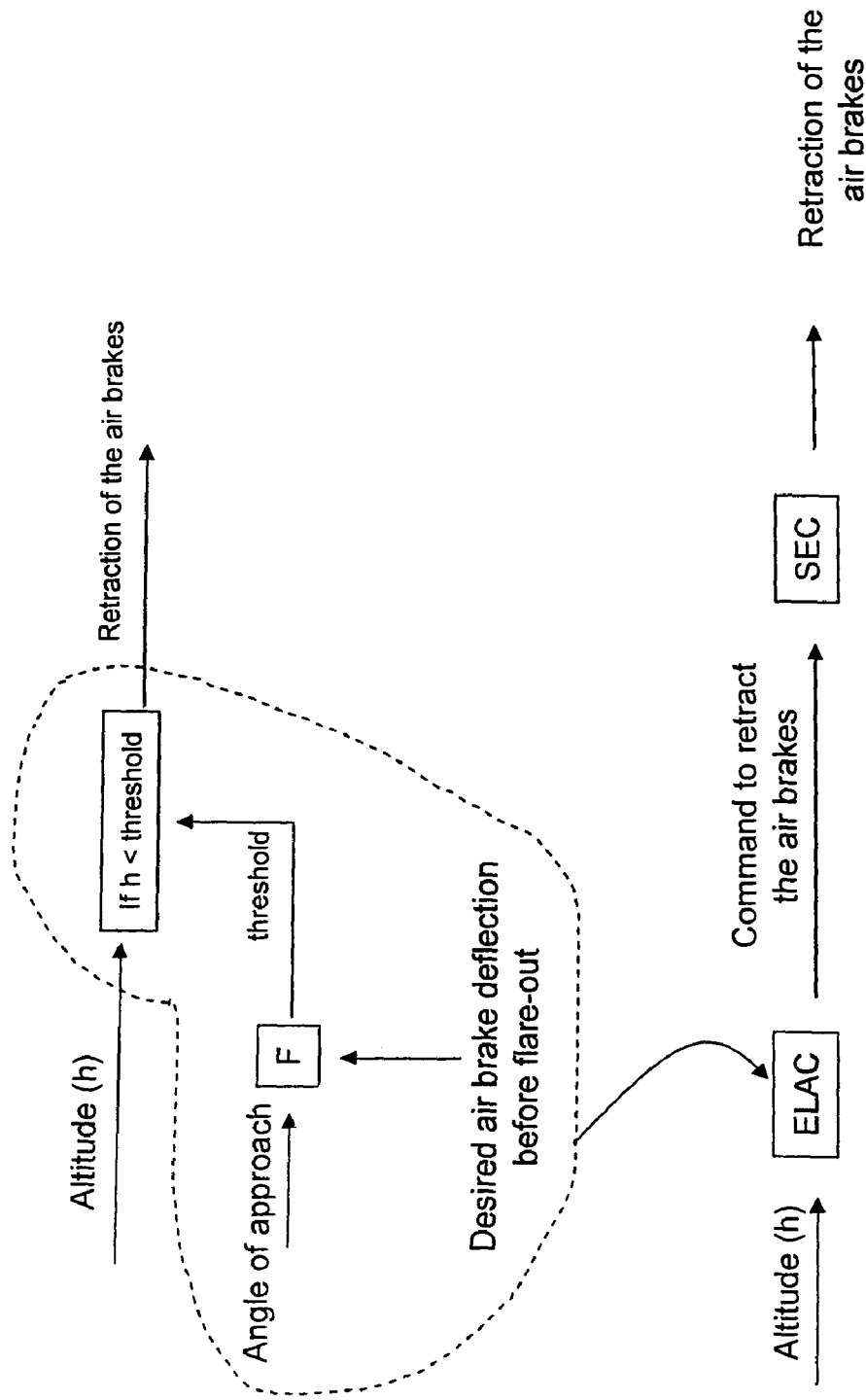
FIG. 11b schematically represents an automatic control device according to invention for improving the maneuverability of an aircraft of FIG. 1 during the landing approach and then flare-out phases.

With reference to FIG. 11*b*, a release upon an altitude threshold and automatic activation of the air brakes has been described.

It is a more evolved mode of realization (automatic retraction of the air brakes) that has the advantage of reducing the work load of the crew.

The logic containing the altitude threshold and the deflection of the air brakes to adopt as a function of this altitude is contained in a computer CALC2.

The command to retract the air brakes (to 0 or another predetermined position) is then sent to the computer CALC1 which manages and controls the deflection of the air brakes.

Figure 11C:
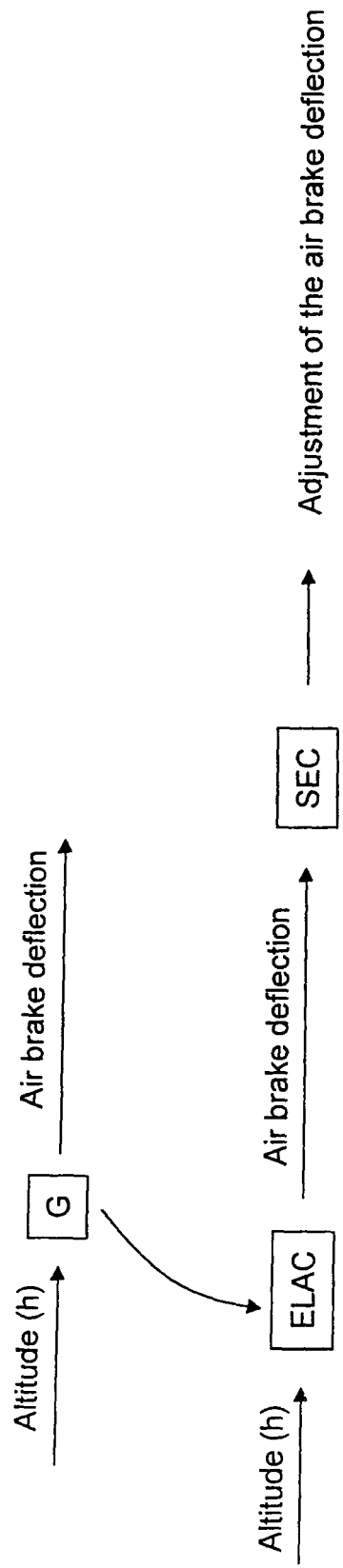
FIG. 11c schematically represents a variant of the device shown in FIG. 11b.

With reference to FIG. 11*c*, a variant of the preceding operating mode is described where the position of the air brakes is a continuous function of the altitude. One no longer calls for a given air brake position based on a given altitude as described with reference to FIG. 11*b*, but calls for a given air brake position for a given altitude.

The function g is a continuous function of the altitude: to each altitude corresponds a deflection of the air brakes.

The logic associated with this function is established in the computer CALC2. The position of the air brakes that has thus been determined by the computer CALC2 is sent to the computer CALC1 which controls the position of the air brakes.

The invention claimed is:

1. A device for improving the maneuverability of an aircraft during an approach phase to landing and then a flare-out phase, in case of a required steep flight path angle of the approach phase, the aircraft being equipped with air brakes, the device comprising:

an actuation unit which deploys and substantially keeps the air brakes in a first deployed position during the approach phase to obtain an angle of incidence of the aircraft during the approach phase of the aircraft; and a control unit which, as a function of a representative parameter of a given altitude, is programmed to control the actuation unit to automatically actuate a progressive transition of the air brakes so that the air brakes retract, for the beginning of the flare-out phase of the aircraft following the steep angle approach, to a second more retracted position than the first position to substantially maintain the same angle of incidence of the aircraft during the flare-out phase of the aircraft.

2. The device according to claim 1 in which the control unit includes a manual control lever while the actuation unit includes a computer which controls the retraction of the air brakes in response to a command emitted by the control lever.

3. The device according to claim 2, in which the control unit is of a computer type suitable for emitting a command sequence upon an altitude threshold while the actuation unit is of a computer type suitable for controlling the retraction of the air brakes in response to an order emitted by the control unit.

4. An aircraft equipped with air brakes including a device for improving the maneuverability of an aircraft during the steep angle approach to landing and then a flare-out phase according to claim 1 or claim 2.

5. The device according to claim 1, wherein retraction of the air brakes is made from a first completely deployed position to a second completely retracted position.

6. The device according to claim 1, wherein retraction of the air brakes is made from a first at least partially deployed position to a second, at least partially retracted position.

7. The device according to claim 1, wherein the aircraft is equipped with trailing edge flaps, and the trailing edge flaps are put into a first deployed position during the approach phase and, as a function of a representative parameter of a given altitude and in case of a steep angle approach, a transition of the trailing edge flaps to a second more deployed position than the first position is actuated.

8. The device according to claim 1, wherein the aircraft is equipped with trailing edge flaps, and the trailing edge flaps are put into a first deployed position during the approach phase and, as a function of a representative parameter of a given altitude and in case of a steep angle approach, a transition of the trailing edge flaps to a second more deployed position that the first position is actuated, and the control of the air brakes and the control of the trailing edge flaps being conjugated.

9. The device according to claim 1, wherein progressively retracting said air brakes from said second position to a further retracted third position during said flare-out phase.

10. The device according to claim 9, wherein said third position is fully retracted.

11. The device according to claim 1, that is free of any reversing of actuation such that an angle of deployment of said air brakes is not increased after deploying and until the landing gear of said aircraft is under load.

12. The device according to claim 1, wherein said actuating unit actuates so that the air brakes retraction is commanded as a function of vertical descent speed of said aircraft.

13. The device according to claim 1, wherein said actuating unit actuates so that the air brakes retraction is commanded as a function of a flare-out altitude for said aircraft.

14. The device according to claim 13, wherein said actuating unit actuates so that the air brakes retraction is commanded at the beginning of the flare-out phase.

15. A device for improving the maneuverability of an aircraft during an approach phase to landing and then a flare-out phase, in case of a required steep flight path angle of the approach phase, the aircraft being equipped with air brakes, the device comprising:

an actuation unit which performs actuation of the air brakes; and a control unit which controls activation of the actuation unit of the air brakes, the control unit configured to automatically deploy and substantially keep the air brakes in a first deployed position during the approach phase to obtain an angle of incidence of the aircraft during the approach phase of the aircraft, and as a function of a representative parameter of a given altitude, the control unit is programmed to automatically actuate a progressive transition of the air brakes to a second more retracted position than the first position to substantially maintain the same angle of incidence of the aircraft during the flare-out phase of the aircraft.

16. The device according to claim 15 in which the control unit is of a computer type suitable for emitting an order sequence as a function of the altitude while the actuating unit is of a computer type suitable for controlling the retraction of the air brakes in response to an order emitted by the control unit.

17. An aircraft equipped with air brakes and an automatic controller of said air brakes including a device for improving the maneuverability of an aircraft during the steep angle approach and then a flare-out phase according to one of the claims 15 to 16.

* * * * *